United States Patent [19]

Fryer

[11] 4,043,788

[45] Aug. 23, 1977

[54] CROP YIELD ADJUVANT

[76] Inventor: Lee Fryer, 11221 Markwood Drive, Silver Spring, Md. 20902

[21] Appl. No.: 717,276

[22] Filed: Aug. 24, 1976

[51] Int. Cl.² ............................................. C05B 15/00
[52] U.S. Cl. ........................................ 71/29; 71/16; 71/DIG. 2
[58] Field of Search ........................ 71/1, 6, 9, 11, 15, 71/16, 20, 23, 27, 29, 31, DIG. 2; 426/69

[56] References Cited

U.S. PATENT DOCUMENTS

| | | | |
|---|---|---|---|
| 1,550,268 | 8/1925 | Kramer et al. | 71/16 X |
| 2,856,286 | 10/1958 | Delarche | 71/16 X |

*Primary Examiner*—Wilbur L. Bascomb, Jr.
*Assistant Examiner*—Ferris H. Lander

[57] ABSTRACT

A novel composition of matter, which when sprayed on crops at low rates improves their yield, is attained by combining hydrolysed fish or fish offal, solubilized seaweed and chelated plant micronutrients.

7 Claims, No Drawings

CROP YIELD ADJUVANT

Modern plant breeders have provided varieties of vegetable species whose germ plasm contains the potential for very large yields of agronomic crops by comparison with the common varieties grown a century ago. While the number of corn growers who attain to the 200 bushels (per acre) level of production grows each year, most farmers, as shown by the national average production, fall far short of this goal. The average crop fails, by far, from achieving the potential bred into its seed.

This failure occurs in spite of the fact that the use of commercial fertilizers has become immense in recent years—over 38 million tons in 1970. Very few commercial planters do not use some sort of fertilizer, yet, based on the national averages, their harvest is much less than it could be.

Environmental factors, of course, account for must of the reduction from possible yields. Drought, pests, cloudiness, cold weather and other bad conditions may prevent a grop from attaining its full yield. In the past, a lack of rainfall on non irrigated farms could be severely limiting to crop production. Moreover, many soils can supply elements other than the nitrogen, phosphorous, potassium, magnesium and sulfur from commercial fertilizer in amounts adequate to give growing young plants a good start but cannot furnish the needed surge of these elements to the mature plant at the time of seed development or intense carbohydrate storage. A certain effect of any of these adverse factors is to reduce the rate of photosynthesis.

Accordingly, an object of this invention is the provision of a material for foliar application to crop plants which significantly increases their harvestable yield.

Another object of this invention is to provide a material for foliar application to crop plants which have been checked by drought to bring them back into production and save the crop.

Another object of this invention is to provide a material for foliar application to mature crop plants to increase their photogynthetic activity.

Another object of this invention is to provide a material to increase the yield of crop plants which may be conveniently applied to these plants from aircraft.

Further objects of this invention will be apparent from the discussion in the following disclosure.

SUMMARY OF THE INVENTION

A composition of matter is prepared by mixing hydrolysed whole fish or fish offal with solubilized seaweed in which chelated plant micronutrients have been dissolved.

THE HYDOLYSED FISH PRODUCT

This invention uses a material consisting of whole fish or fish offal which has been hydrolysed in a strong solution of potassium hydroxide by prolonged heating at the boiling point. When all of the soft materials have been dissolved and cooked long enough so that no material precipitates upon neutralization, phosphoric acid is added to the reaction products until the ratio of $K_2O$ to $P_2O_5$ in the mixture is about 1 to 1. Enough biuret free urea is added to the mixture to bring the nitrogen into a gronomic balance. The final product may be adjusted to a 10-5-5, 8-4-4 or similar final fertilizer analysis (oxide basis) The specifications for the liquid fish hydrolysate used in this invention includes the requirement that at least 6 lbs. of fish material be included in each gallon of hydrolysate and that the phosphoric acid be essentially free of arsenic.

THE SOLUBILIZED SEAWEED

The solubilized seaweed used in this invention is prepared by hydrolysing brown marine algae. These plants include rockweeds, bladder worts, oar weeds and giant marine kelps. Most of the available soluble seaweeds are prepared from rockweeds, mostly *Ascophlium nodosum* and the Fucus species which grow beside them. The gathered seaweeds are ground and treated with alkaline or acidic solutions at elevated temperature and pressure to break up the polymerized carbohydrates which comprise most of their structure. The cooled solution of kelp is filtered free from residual cellulose, and may be used directly or may be dried to be reconstituted by the user.

Seaweed may also be incubated with Lactobacilli species to obtain a liquid product.

THE CHELATED MICRONUTRIENTS

While soluble kelp contains among its more than 40 mineral elements the plant micronutrients, iron, zinc, manganese, copper, boron and molybdenum, I have found that the titre of these elements in the seaweed products is lower that their optimum levels as measured by plant response. In consequence, I add these six elements in a balanced composition as chelated and protected forms, known to be adequate for foliar feeding of plants. Conveniently, I use them as their lingosulfonates in the case of the metals and as the lignosulfonates mixed with boron and molybdenum compounds.

EXAMPLES

EXAMPLE 1

The following are mixed:

| | |
|---|---|
| Carp & Scrap fish hydrolysate (8-4-4) | 3 quarts |
| Lacto bacilli treated seaweed | 6 fluid oz. |
| Dried soluble seaweed | 6 oz. avdp. |
| Chelated Minerals (Lignosulfonates) | 4 oz. avdp. |
| Water | to make 1 gallon |

The product is black and slightly viscous.

Example 2

The composition of Example 1. was sprayed on soybeans at the time of first blossoming, at the rate of 8 oz. per acre dissolved in 3 gallons of water. At harvest, the sprayed portion of the field yielded 49 bushels of beans per acre. The untreated portion of the field produced 32 bushels per acre.

Example 3

Half of a 1000 acre wheat field in Arkansas was sprayed with the composition of Example 1. The material was applied at the rate of 8 oz. per acre. The application resulted in a 30% increase in harvested wheat.

Example 4

Because of extreme drought, farmers in an Iowa district were faced with poorly growing corn and an apparent crop failure. One of them elected to have the composition of Example 1 flow on 40 acres of his fields. In 2 days the treated corn had recovered. The green color had returned and they were actively photosynthesizing once more.

DISCUSSION

From the cited examples, one familiar with the details of plant growth and development, can see that the foliar provision of this invention to crops during their stress period of seed formation or at a time of moisture stress is of great benefit. At 8 oz. per acre, the nutrients derived from the fish hydrolysates are clearly insignificant by comparison with the weight of nitrogen in the crop. 40 bushels of soy beans, for example, contain over 100 lbs. of nitrogen, but the spray provides only 0.015 lbs. of nitrogen per acre. In is clear that the composition of this invention is not a foliar fertilizer in the sense that it supplies useful amounts of the major plant nutrients.

Moreover, the amounts of micronutrients applied (0.015 lbs. of 4% Fe, 1.4% Zn, 1.2% Mn, 0.4% Cu, 0.8% B and 0.04% Mo) are about 1/500 of the amounts of the chelate normally applied to an acre of growing plants. The action of such a small dosage of micronutrients is negligible.

In the same way the amount of seaweed hydrolysate applied per acre (0.018 lbs. of solids) is about 4% of the usual application of soluble seaweed.

By these comparisons, it is evident that no person who was familiar with the agronomic action of any or all of the components of this invention would except any response of plants at all to the application of as low as 8 oz. of my composition to an acre of corn, soybeans, wheat or any other crop. That a considerable response is obtained is evident from the examples. It will be obvious to any experienced plant physiologist that my composition and its effective rate of application could be strengthened. A stronger fish hydrolysate even a 12-6-6 could be employed, however the fish content of such a strong material would be lowered. More of the other ingredients could replace the water of the formula. The product could be applied at rates of a quart or a gallon of the material per acre. However the intention of this disclosure is to teach the formulation and use of the minimal effective strength of product and the lowest effective rate of application.

A small addition of a wetting agent to the product (Example 1.) is optional. It could be done at the time of manufacture or when the material was diluted for field application. I have seen no benefit from the inclusion of a wetting agent in the spray except when it was applied to leaves such as pea leaves which are difficult to wet.

The lignusulfonate chelated micronutrients have been used because they are conveniently compounded and readily adaptable to the formula. Other metallic chelates such as the EDTA complexes, compounds of metals with tree bark chemicals, polyphosphates and the like could be used.

I claim:

1. A new composition of matter consisting of fish, hydrolysed with potassium hydroxide, neutralized with phosphoric acid, and augmented with urea to provide the major plant nutrients in the ratio of 2 parts nitrogen to 1 part $P_2O_5$ and 1 part $K_2O$, seaweed hydrolysates prepared by the action of Lactobacilli on seaweed and by the chemical hydrolysis of seaweed, and a source of chelated plant micronutrients for application to crop plants to enhance their yields.

2. The composition of claim 1 in which the ingredients are provided in the following amounts:

| | | |
|---|---|---|
| fish hydrolysate | | 75 parts |
| Lactobacilli cultured seaweed as a 20% non water content | | 4.7 parts |
| Solubilized seaweed powder | | 4.7 parts |
| Lignosulfonate chelated plant micronutrients | | 3.1 parts |
| Water | | 12.5 parts |
| | Sum | 100.0 parts |

3. The composition of claim 2. in which the fish hydrolysate is of 8-4-4 (N-$P_2O_5$-$K_2O$) analysis.

4. The composition of claim 2 in which the lignosulfate chelated plant micronutrients material contains:

| | | |
|---|---|---|
| Iron | (Fe) | 4% |
| Zinc | (Zn) | 1.4% |
| Manganese | (Mn) | 1.2% |
| Copper | (Cu) | 0.4% |
| Boron | (B) | 0.8% |
| Molybdenum | (Mo) | 0.04% |

5. The composition of claim 1 on which the formula is enhanced by the use of more seaweed and chelated plant micronutrients to contain the following ingredients:

| | | |
|---|---|---|
| fish hydrolysate | | 75 parts |
| lacto bacilli cultured seaweed in a 20% non water solution | | 9.4 parts |
| solubilized seaweed powder | | 9.4 parts |
| lignosulfonated, chelated, plant nutrients | | 6.2 parts |
| | Sum | 100.0 parts |

6. The composition of claim 2 which is sprayed on plants at the rate of 8 ounces per acre, diluted according to the type of applicator.

7. The composition of claim 2 which is sprayed on plants in amounts in excess of 8 ounces per acre, diluted according to the type of applicator.

* * * * *